(12) United States Patent
Vobugari et al.

(10) Patent No.: US 8,813,026 B1
(45) Date of Patent: Aug. 19, 2014

(54) METHODS AND APPARATUS FOR STORING INFORMATION FOR COMPONENTS OF A SYSTEM IN MODEL COMPONENT FILES TO PROVIDE A WORLD VIEW OF THE SYSTEM

(75) Inventors: Raja B. Vobugari, Milford, MA (US); Christopher J. Hackett, Boylston, MA (US)

(73) Assignee: EMC Corporation, Hopkinton, MA (US)

( * ) Notice: Subject to any disclaimer, the term of this patent is extended or adjusted under 35 U.S.C. 154(b) by 181 days.

(21) Appl. No.: 13/249,365

(22) Filed: Sep. 30, 2011

(51) Int. Cl.
*G06F 17/00* (2006.01)
*G06F 17/22* (2006.01)
*G06F 17/28* (2006.01)
*G06F 3/00* (2006.01)
*G06F 9/44* (2006.01)
*G06F 9/45* (2006.01)
*G06F 9/46* (2006.01)

(52) U.S. Cl.
USPC ........... 717/104; 715/200; 715/255; 715/744; 717/105; 717/106; 717/107; 717/108; 717/109; 717/114; 717/120; 717/131; 717/136; 717/168; 717/172; 719/330

(58) Field of Classification Search
None
See application file for complete search history.

(56) References Cited

U.S. PATENT DOCUMENTS

| | | | |
|---|---|---|---|
| 7,409,636 B2 * | 8/2008 | Meijer et al. | 715/255 |
| 7,483,825 B2 * | 1/2009 | Van Huben et al. | 717/131 |
| 7,571,082 B2 * | 8/2009 | Gilpin et al. | 717/120 |
| 7,987,086 B2 * | 7/2011 | Van Huben et al. | 717/131 |
| 8,099,709 B2 * | 1/2012 | Baikov et al. | 717/104 |
| 2002/0104068 A1 * | 8/2002 | Barrett et al. | 717/104 |
| 2002/0184610 A1 * | 12/2002 | Chong et al. | 717/109 |
| 2004/0031015 A1 * | 2/2004 | Ben-Romdhane et al. | 717/107 |
| 2005/0022171 A1 * | 1/2005 | Langkafel et al. | 717/136 |
| 2005/0149914 A1 * | 7/2005 | Krapf et al. | 717/136 |
| 2005/0229152 A1 * | 10/2005 | Connell et al. | 717/104 |
| 2006/0174252 A1 * | 8/2006 | Besbris et al. | 719/330 |
| 2006/0184915 A1 * | 8/2006 | DeGroote et al. | 717/106 |
| 2007/0028163 A1 * | 2/2007 | Meijer et al. | 715/513 |
| 2007/0277095 A1 * | 11/2007 | Ukigawa | 715/513 |
| 2008/0059944 A1 * | 3/2008 | Patterson et al. | 717/104 |
| 2008/0082959 A1 * | 4/2008 | Fowler | 717/104 |
| 2009/0064123 A1 * | 3/2009 | Ramesh et al. | 717/168 |
| 2009/0172637 A1 * | 7/2009 | Parikh | 717/114 |
| 2009/0177955 A1 * | 7/2009 | Liu et al. | 715/200 |
| 2010/0088668 A1 * | 4/2010 | Yoshihama et al. | 717/105 |
| 2010/0131857 A1 * | 5/2010 | Prigge | 715/744 |
| 2010/0131916 A1 * | 5/2010 | Prigge | 717/104 |
| 2010/0281455 A1 * | 11/2010 | Anand et al. | 717/104 |
| 2010/0281462 A1 * | 11/2010 | Festa | 717/108 |
| 2012/0159468 A1 * | 6/2012 | Joshi et al. | 717/172 |

* cited by examiner

*Primary Examiner* — Don Wong
*Assistant Examiner* — Anibal Rivera
(74) *Attorney, Agent, or Firm* — Daly, Crowley, Mofford & Durkee, LLP

(57) ABSTRACT

Method and apparatus for representing data for components of a system in respective model components, generating model sub components from model components for at least some of the system components, and accumulating information from the model components and model sub components to determine a world view of the system. In one embodiment, model components can be updated during system operation.

15 Claims, 13 Drawing Sheets

```
<ISORequests>
    <ISORequest>
        <Products>ArchwayFlexHelper</Products>
        <Template>RMSqlBackup</Template>
        <Params>
            <atmosid>Atmos</atmosid>
        </Params>
    </ISORequest>
</ISORequests>
```

*FIG. 7A*

```
<ISORequests>
 <RequestHeader>
   <Template>
     <Inputs>
       <Input name="vmServerName" asftrans="text" default="[$FlexMap/Vcenter[1]/Name]">//Workflow/
Operation[2]/Tasks/Task/Applications/Application/Details/aa_virtual_center</Input>
       <Input name="urmAddStorage" xml="outer">//Workflow/Operation/StorageSystems</Input>
       <Input name="Product">//ISORequest/Products</Input>
       <Input name="SimulateFile">//ISORequest/SimulateFile</Input>
       <Input name="ServerHost" asftrans="text" default="[$FlexMap/Host[1]/Name]>//ISORequest/ServerHost</Input>
ServerHost</Input>
       <Input name="ServerPort">//ISORequest/ServerPort</Input>
       <Input name="Username">//ISORequest/Username</Input>
       <Input name="Password">//ISORequest/Password</Input>
       <Input name="otherStuff" default="defaultOtherStuffValue">//ISORequest/OtherStuff</Input>
       <Input name="NoProcess" default1="request">//ISORequest/Echo</Input>
     </Inputs>
     <Outputs>
       <Output name"returnValue" default="-1">//Response/DataSet/ResponseValues/Row/returnValue</Output>
Output>
       <Output name"numRows" default="-1">//Response/DataSet/ResponseData/Row/numRows</Output>
       <Output name="ASF.ErrorCode">//ISOResponses/Reports/Report/@ASF.ErrorCode</Output>
       <Output name="SM.success" default="False">//ISOResponses/Reports/Report/@success</Output>
       <Output name="ASF.ErrorMessage">//ISOResponses/Reports/Report/@ASF.ErrorMessage</Output>
       <Output name="ASF.PercentCompleted">//ISOResponses/Reports/Report/@ASF.PercentCompleted</Output>
       <Output name="ASF.StatusMessage">/ISOResponses/Reports/Report/@ASF.ASF.StatusMessage</Output>
       <Output name="ASF.Logfile" default="N/A">/ISOResponses/Reports/Report/@ASF.Logfile</Output>
     </Outputs>
   </Template>
 </RequestHeader>

<ISORequest>
<techo></techo>
<Echo>request</Echo>
<Products>ConsOps</Products>
<Request>
  <Args>
    <Arg>-file=%TEMP%\NaviCreateDestroySGLuns_2.txt</Arg>
    <Arg>-appName=NaviSec</Arg>
    <Arg>-diagnostics=0</Arg>
    <Arg asftrans="option">-appServerName=#(Host)</Arg>
    <Arg asftrans="option">-targetServerName=#(Host)</Arg>
    <Arg asftrans="option">-targetServerIP=[$FlexMap/Host[Name='#(Host)']/IP]</Arg>
    <Arg asftrans="option">-destroy=#(Destroy)</Arg>
    <Arg asftrans="option">-diagnostics=1</Arg>
     <Arg asftrans="option">-diagnostics=1</Arg>
     <Arg asftrans="xml">[$RepositoryXml/Item[Name='ConfigureApplicationSet']]</Arg>
    </Args>
  </Request>
 </ISORequest>
</ISORequests>
```

*FIG. 7B*

```xml
<ISORequests>
   <RequestHeader>
      <AIR>
         <Options asynchronous="is">
         </Options>
         <AlternateASF Server="" Port="" Remoting="">
         </AlternateASF>
         <Options timeout="3000">
         </Options>
         <PWClient>USENHACKECD1C</PWClient>
      </AIR>
   </RequestHeader>
   <ISORequest>
      <Products>AtmosClient</Products>
      <Request>
         <Params>
            <filepath cmdsetASF="filepath">
            </filepath>
            <CIM>
               <cimdomain>
               </cimdomain>
               <filepath cmdsetASF="filepath">
               </filepath>
               <cimuser>administrator</cimuser>
               <cimpwd>winboss</cimpwd>
               <cimhost cmdsetASF="host">
               </cimhost>
            </CIM>
            <operation>create</operation>
            <metadata>
               <metadata>
                  <meta>
                     <au_user>rmsqlbackup</au_user>
                     <au_name>myName</au_name>
                     <au_client cmdsetASF="host">myClient</au_client>
                     <au_time cmdsetASF="time">9/2/2009 10:07:32 AM</au_time>
                     <au_host>lrmf204</au_host>
                     <au_srcdata>sqlcopy</au_srcdata>
                     <au_Datafile cmdsetASF="filepath">
                     </au_Datafile>
                     <au_SourceGun>
                     </au_SourceGun>
                     <au_TargetGun>
                     </au_TargetGun>
                     <au_blob>
                        <BcdContents>
                           <RM_DB name="RM_DB_Metadata">
                           </RM_DB>
                           <RM_SQLMD name="RMSQLMETADATA_TBD">
                           </RM_SQLMD>
                           <RM_VSS_BCD name="RM_VSS_BCD">
                           </RM_VSS_BCD>
                        </BcdContents>
                     </au_blob>
                  </meta>
               </metadata>
            </metadata>
            <Atmos>
               <atmosid>Atmos</atmosid>
            </Atmos>
         </Params>
         <Args>
         </Args>
      </Request>
   </ISORequest>
</ISORequests>
```

*FIG. 7C*

```
<ISOResponses>
<ResponseHeader>
<AIRTrack>
    <Instance>6345221294015875829;USENHACKECD1C;8091;2011-09-21T14:42:20.158-0400;MsgQueueHost.exe;C:\WORK_TSP\ASFSM1-ddysert-2010\VL\VL.ServiceManager\MsgQueueHost\bin\Debug\;AccumResponse;</Instance>
</AIRTrack>
<runtimeinformation reponseid="USENHACKECD1C;6345221294016475411" clientparam="UnknownUserHostAddress" >
<time start="9/21/2011 2:42:20 PM" end="9/21/2011 2:42:20 PM" timespan="0.142"/>
<count reportcount="1" errorcount="0"/>
</runtimeinformation>
</ResponseHeader>
<Reports>
<Report product="ArchwayFlexHelper" timespan="0.135" sequence="163" success="True" ASF.ErrorCode="0" ASF.ErrorMessage="" ASF.InfoMessage="" ASF.PercentCompleted="" ASF.StatusMessage="" ASF.Logfile="" >
<ContentIndex/>
</Report>
</Reports>
</ISOResponses>
```

*FIG. 7D*

METHODS AND APPARATUS FOR STORING INFORMATION FOR COMPONENTS OF A SYSTEM IN MODEL COMPONENT FILES TO PROVIDE A WORLD VIEW OF THE SYSTEM

BACKGROUND

As is known in the art, conventional systems run by means of processor execution of compiled code. Such systems having compiled language programming and system design/implementation approaches have a lengthy development cycle and complex deployment considerations. Conventional programming code and API (Application Programming Interface) driven approaches require specialized tooling (development environments, source code control system tools, compilers, linkers, etc.) to incorporate changes to system functionality. In addition, the modified system requires deploying constructed artifacts to an operational system in order to provide new/altered systems functionality. The API driven approach produces artifacts that are highly dependent on one another and prone to breakage when changes in some part of the system occur. Systems that use programming APIs (e.g., REST, SOAP, RPC, static/dynamic class linkage, etc.) as the fundamental interaction mechanism may suffer from this disadvantage.

SUMMARY

In one aspect of the invention, exemplary embodiments provide methods and apparatus for representing information for components of a system in model components that provide a world view of the system. In one embodiment, the model components are XML documents that cross reference other model components. The model components provide data to service requests, such as backup of a storage volume.

In one embodiment, a method comprises representing data for components of a system in respective model components, generating model sub components from model components for at least some of the system components, and accumulating information from the model components and model sub components to determine a world view of the system.

In another aspect of the invention, exemplary embodiments provide methods and apparatus for servicing requests, such as user requests, by accessing data from model components. In one embodiment, the user request is expanded in accordance with a template to combine data from the model components, host data, and/or user supplied data. An internal response having a particular format is generated for inserting data into one or more of the model components. A client response is then generated for the user request.

In one embodiment, a method comprises: receiving a request from a user of a system, the request having a format defined by a template, expanding the request to combine user supplied data and data from a model component containing data for a component of the system to form an expanded request, wherein the expanded request has a predetermined format, acquiring information to determine how to process the expanded request, communicating with a host computer to extract information needed to satisfy the expanded request, generating an internal response to the expanded request containing the acquired information, inserting result data from the internal response into the model component, generating a user response to the user request, and, sending the user response to the user to satisfy the user request.

BRIEF DESCRIPTION OF THE DRAWINGS

The foregoing features of this invention, as well as the invention itself, may be more fully understood from the following description of the drawings in which:

FIG. 7A is a representation of an exemplary request;
FIG. 7B is a representation of an exemplary template expansion;
FIG. 7C is a representation of an exemplary request format;
FIG. 7D is a representation of an exemplary response to the request.

DETAILED DESCRIPTION

Figure 1:
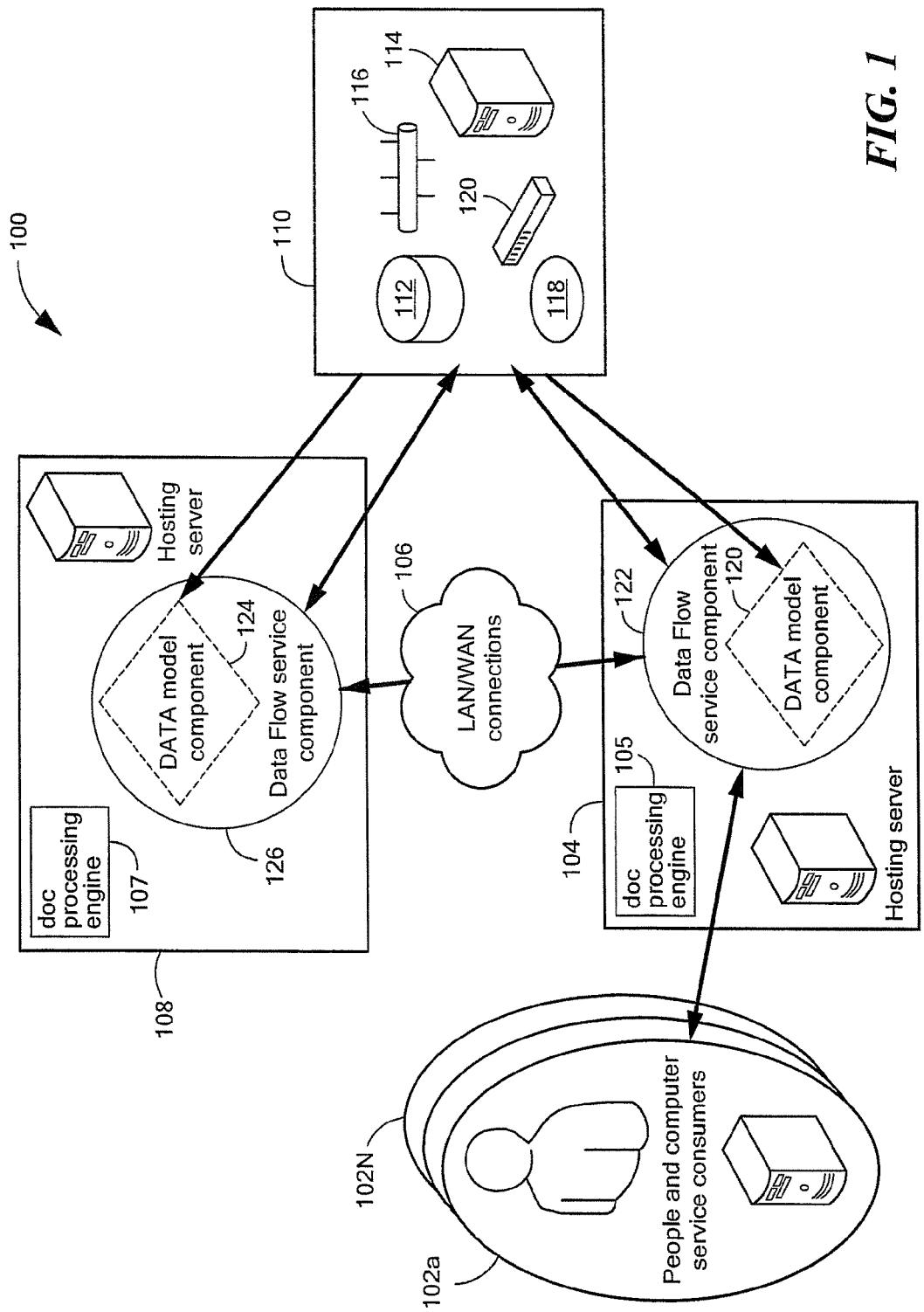
FIG. 1 is a schematic representation of a system having model data.

FIG. 1 shows an exemplary system 100 including a series of clients 102a-N coupled to a first host server 104, which is coupled via a network 106 to a second host server 108. A number of components 110 are coupled to the network 106, such as databases 112, servers 114, storage arrays 116, applications 118, and networks 120. In one embodiment, the system 100 can be provided as a data storage system having replication and other functionality. The first host server 104 includes a data model component 120 to support a data flow service component 122. Similarly, the second host server 108 includes a respective data model component 124 and data flow service component 126. The data model components 120, 124 interact with the network components to provide a 'world view' used by the data flow service components 122, 126, as described more fully below. As used herein, the term "world view" refers to the fact that the model contains all information relevant and necessary to support information data flows. Everything that the system "knows" is described in the model. Services are the eyes, ears, and arms of the system —they interact with the world to make changes and to supply additional data expanding the "world view". This is in contrast with conventional systems which may contain much of the same information and similar functionality, however, such systems are heterogeneous data systems lacking a central 'brain' where information about the world is maintained and processed in a consistent and homogeneous manner.

In exemplary embodiments, the first and second host servers 104, 108 include respective document processing engines 105, 107 to combine data from various documents, such as XML documents from service requestors and service providers with template and transform documents, as described more fully below.

It is understood that model components can be stored in any practical location in disk files, for example. Exemplary model components are listed below:
ASF.Apps.Config.Archway.xml --application config
ASF.Apps.Config.ASMS.xml --application config
ASF.Apps.Config.AutoStart.xml --application config
ASF.Apps.Config.AutoStart_mt.xml --application config
ASF.Apps.Config.CXNATIVE.xml --application config
ASF.Apps.Config.RM.xml --application config ASF.Apps.Config.RMHOST.xml --application config
ASF.Apps.Config.SSHOST.xml --application config
ASF.Apps.Config.Staf.xml --application config
ASF.Apps.Config.URM.xml --Service config
ASF.Apps.Data.URM.xml --Service config
ASF.PIugin.Config.Xml --General Service config
AWS.Host.Config.xml --Communications Service config
ASF.Host.config.xml --System runtime config
ASF.Apps.Config.xml --System configuration
ASF.Emc.Config.xml --System configuration
ASF.ExceptionLog.config.xml --System configuration
ASF.Licensing.Config.xml --System configuration
ASF.Macro.Config.Xml --System configuration
Local.cfgd.xml --System configuration It is understood that model component can comprise a single file or files containing a definition file for several components. For example, in the above list, ASF.Apps.Config.RM.xml is a file with most of the information for Replication Manager interfaces and data. ASF.Plugin.Config.Xml contains metadata for a number of services and supporting data, which is small enough that a single file is more convenient. ASF.Apps.Config.Archway.xml contains all of the information specific to Archway interfaces.

An exemplary service component comprises the information to locate and load the service dlls and any supporting data. It is understood that dll refers to a dynamic linked library file containing a set of procedures and/or drivers that are referenced and executed by a program to allow multiple programs to access shared system functions through common libraries, and may be dynamically linked into a program at runtime.

An example for web services service endpoint follows. It has metadata to locate the main service executable dll (ProcClass and Assy), where the exposure of the service occurs (Virtualdirectory, Port, PhysicalDirectory), etc. Similiar types of service have similar sets of metadata.

<AWSHostService>
    <ProcClass type="asfpluginclass"> AWSHostProvider.AWSHostService</ProcClass>
    <Assy type="assembly" path="~System/install/ASFDir" param2="CP/CP.AWSHOst/"control2= "~deploypath">CP.AWSHost.dl1</Assy>
    <VirtualDirector>/AWS/</VirtualDirectory>
    <Port mgtStyle="IPPort" desc="set to 80 if IIS not running so we look like normal web services without IIS">8282</Port>
    <PhysicalDirectory type="path" path="~System/install/ASFDir" param2="CP/CP.AWSHost/"control2= "~deploypath"<l>/PhysicalDirectory>
    <PortDir>[~Plugin/AWSHostService/Port][~Plugin/AWSHostService/VirtualDirectory]</PortDir>
    <Prefixes>http://[~System/Configuration/IP]:[~Plugin/AWSHostService/PortDir];http://[~System/configuration/Service]:[~Plugin/AWSHost
</AWSHostService>

It is understood that any suitable hardware and/or software device/component can be coupled to the network 106 and form part of the system 100. In general, similar metadata is used for both physical and logical components (e.g., a physical server hosting a database and a database instance running on that server). It is how other services use the model data where the distinction arises. For instance a query string will be composed in part with the database instance and credentials to access it, while for a hardware component such as a storage array, its model data comprises an IP addresses, SAN Fabric WWNs, etc., as well as data such as credentials to access it.

While exemplary embodiments of the invention may use the term XML (Extensible Markup Language), it is understood that, as used herein, XML refers to markup languages in general, without limitation to only XML. Exemplary embodiments of the invention use XML formatted in a particular manner using xml attributes as meta data for describing in a consistent manner service constructs, data processing constructs, and other supporting constructs all of which are part of the invention. XML is used to describe exemplary embodiments of the invention in addition to its use as part of the invention.

Figure 2:
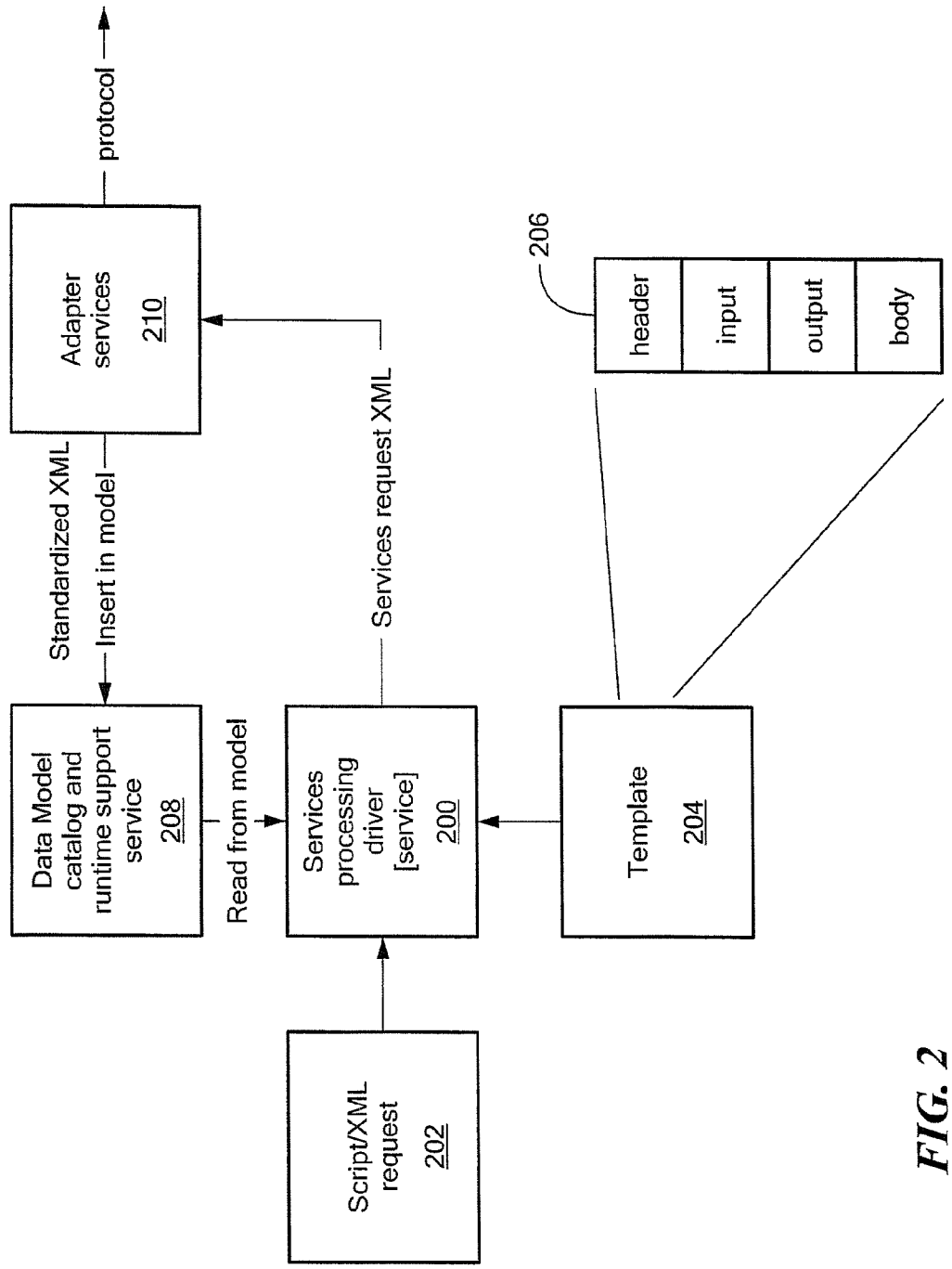
FIG. 2 is a representation of service processing.

FIG. 2 shows an exemplary implementation for data driven software system implementation of a highly adaptable data driven dynamic message processing system. A services processing driver 200 receives a script/XML request 202. A template 204 can be used to construct the request. In one embodiment, a template 204 is used for general processing of instructions, mapping of data into a request and out from the response, and requesting a body structure to formulate the request. An exemplary template 206 (see FIG. 7B) includes a header, and input field, an output field, and a body. The services processing driver 200 reads data from a data model catalog and runtime support service 208, as described more fully below, and sends a service request (in XML, for example) to an adapter service 210, which inserts data into the data model 206 and transmits response information for the request.

It is understood that the bi-directional protocol used between the adapter service 210 and the external service it communicates with is particular to that external service. For example, it might be a raw sockets proprietary data encoding protocol (such as Replication Manager communications), a SOAP/HTTP Web service (such as VWare Vcenter), or some other protocol endpoint type supported, as described more fully below.

Figure 3:
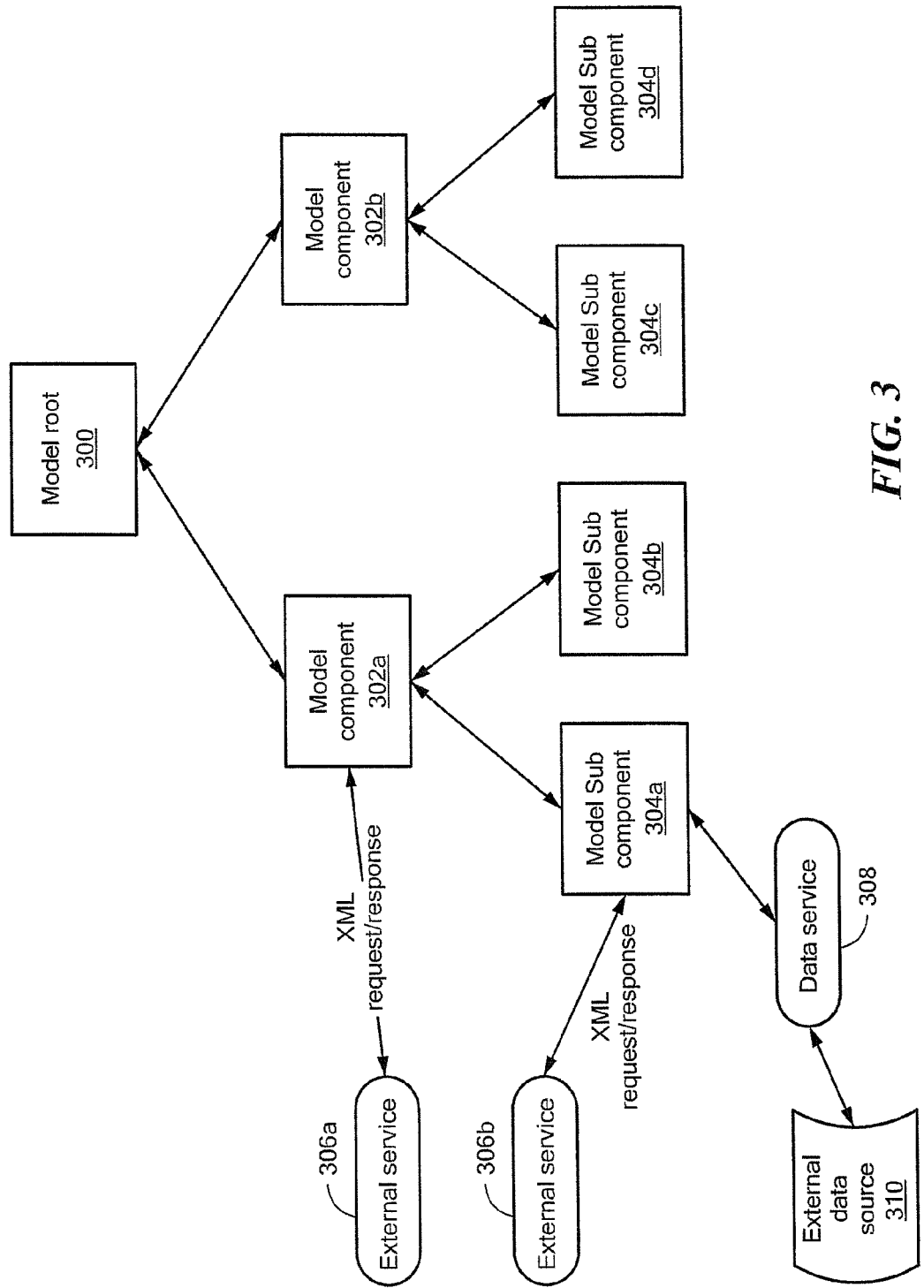
FIG. 3 is a representation of model roots, model components, and model sub components.

FIG. 3 shows further detail for the data model catalog and runtime support service 206 of FIG. 2. A model root 300 is used to derive a series of model components 302a,b, which are used to derive respective model sub components 304a-d. In exemplary embodiments, the model components are XML files, as described more fully below. A model component 302 interacts with an external service 306a via a request/response. Model sub components 304a also interact with external services 306b. A model sub component 304a also interacts with a data service 308, which provides the information to an external data source 310.

Exemplary external services include Replication Manager Server, VCenter Server, Archway Server, RecoverPoint appliance, Symmetrix, VNX, Clariion, etc., storage arrays, SQL Server, etc. It is understood that where vendor names are used for a service, the vendor name is intended to cover the generic type of service provided.

With regard to model component and model sub components, it is understood that the hierarchy shown reflects composition and not inheritance. Typically the model components are independent physical files broken down by what makes physical and logical sense. For instance a set of standard service definitions which all systems include is in a single model component file for convenience. This model file can include other model files which might describe a single service and its supporting data, or possibly be data for another set of services that 'go together' for logical and/or deployment reasons.

Example of composition: ASF.Host.config.XML contains the following fragment where "AppendConfigFileHere" and "MergeConfigFileHere" are key words that cause additional files to be read in to construct the main model when the system powers on.

<RepeatingPlugins1>SMCPSOCKETS;DataServer</RepeatingPlugins1>
<RepeatingPlugins1>EMCAPI;SMCPSockets;DataServer</RepeatingPlugins1>
<AppendConfigFileHere>[~ConfigurationDirDefault]/TransformFiles/ASF.InterfaceTemplates.Config.xml>/AppendConfigFileHere>
</System>
<MergeConfigFileHere>[~ConfigurationDirDefault]/ASF.Emc.Config.xml</MergeConfigFileHere>
<MergeConfigFileHere>[~ConfigurationDirDefault]/ASF.Apps.Config.xml</MergeConfigFileHere>
<MergeConfigFileHere>[~ConfigurationDirDefault]/ASF.Apps.Data.URM.xml]</MergeConfigFileHere>
<Me rgeConfigFileHere>[~ConfigurationDirDefaulWASF.Apps.Config.RMDeplSupport.xml</MergeConfig FileHere>
</configuration>

For cross references, a particular model component might require information from another model component: For instance the AWSHostService web services model data shown above needs to expose an endpoint and needs the IP address which is stored in the system configuration model component.

<AWSHostService><Prefixes>http://[~System/Configuration/IP]:[~P . . .

In general, XML configuration files are combined to provide a 'world view' of data, where there is a data model for everything in the 'world.' The data model is structured, composable, homogenized, navigable, and integratable. It is understood that composable means that model parts can be combined into a larger model. Homogenized means that a consistent way of representing a wide variety of data sources is used. Navigable refers to the use of addressable intra-model references including nomenclature for managing addressability of disparate data sources.

Figure 4:
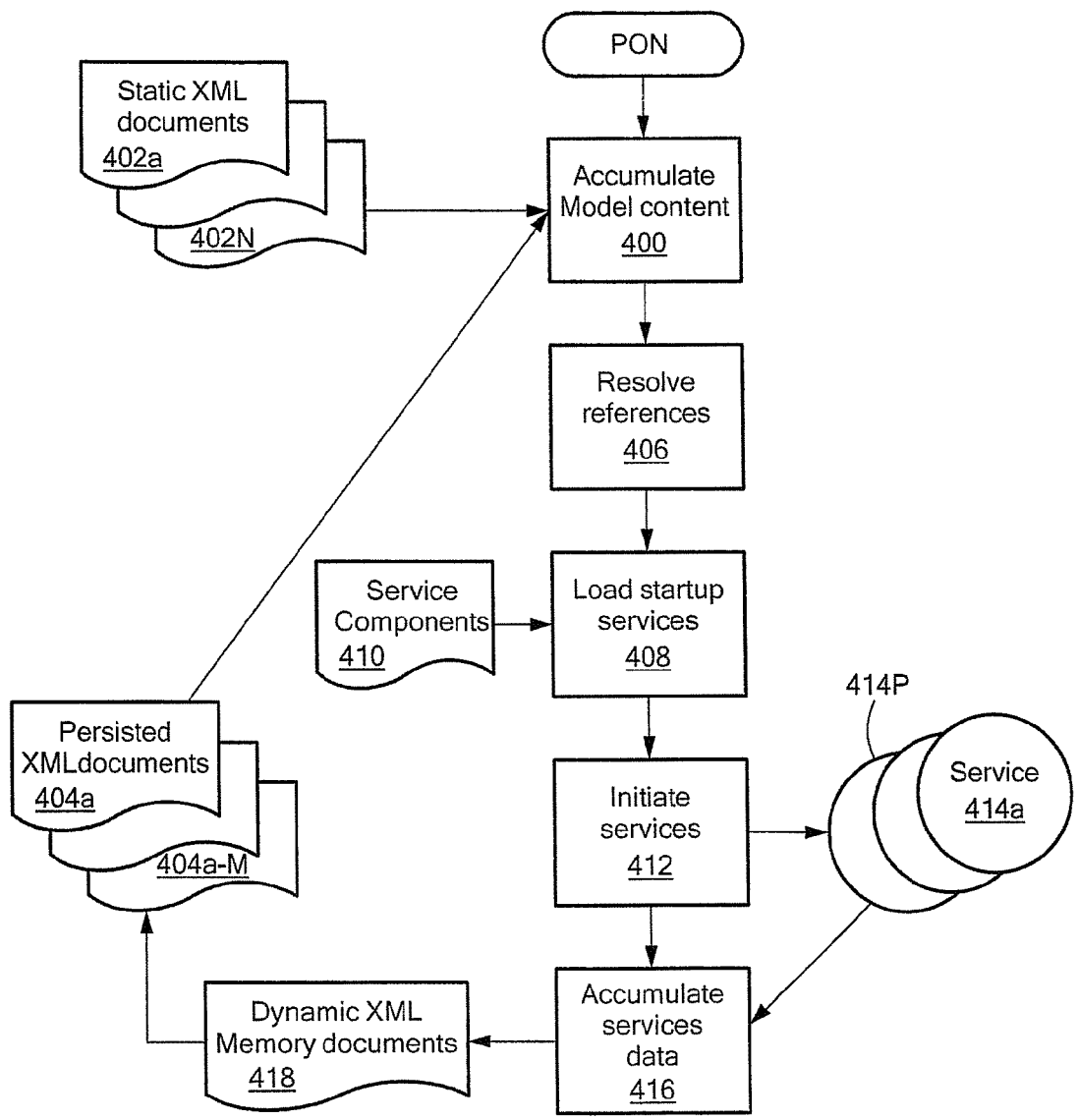
FIG. 4 is a representation of service initiation.

FIG. 4 shows an exemplary sequence of steps for constructing a world view for a system, after power on, from initial files, discovered data, and dynamically persisted data. In step 400, the model accumulates static content from static XML documents 402a-N and persisted XML documents 404a-M.

It is understood that model components can include metadata indicating that as data is added to particular nodes in the model this data should be persisted. The persistence comprises recording changes to the model in these particular areas in xml documents whose name reflects the xpath of the data being saved. Upon power on, the system loads these files in a manner similar to other model files, with the exception that these are discovered dynamically as opposed to statically pre-defined in model files.

Figure 5:
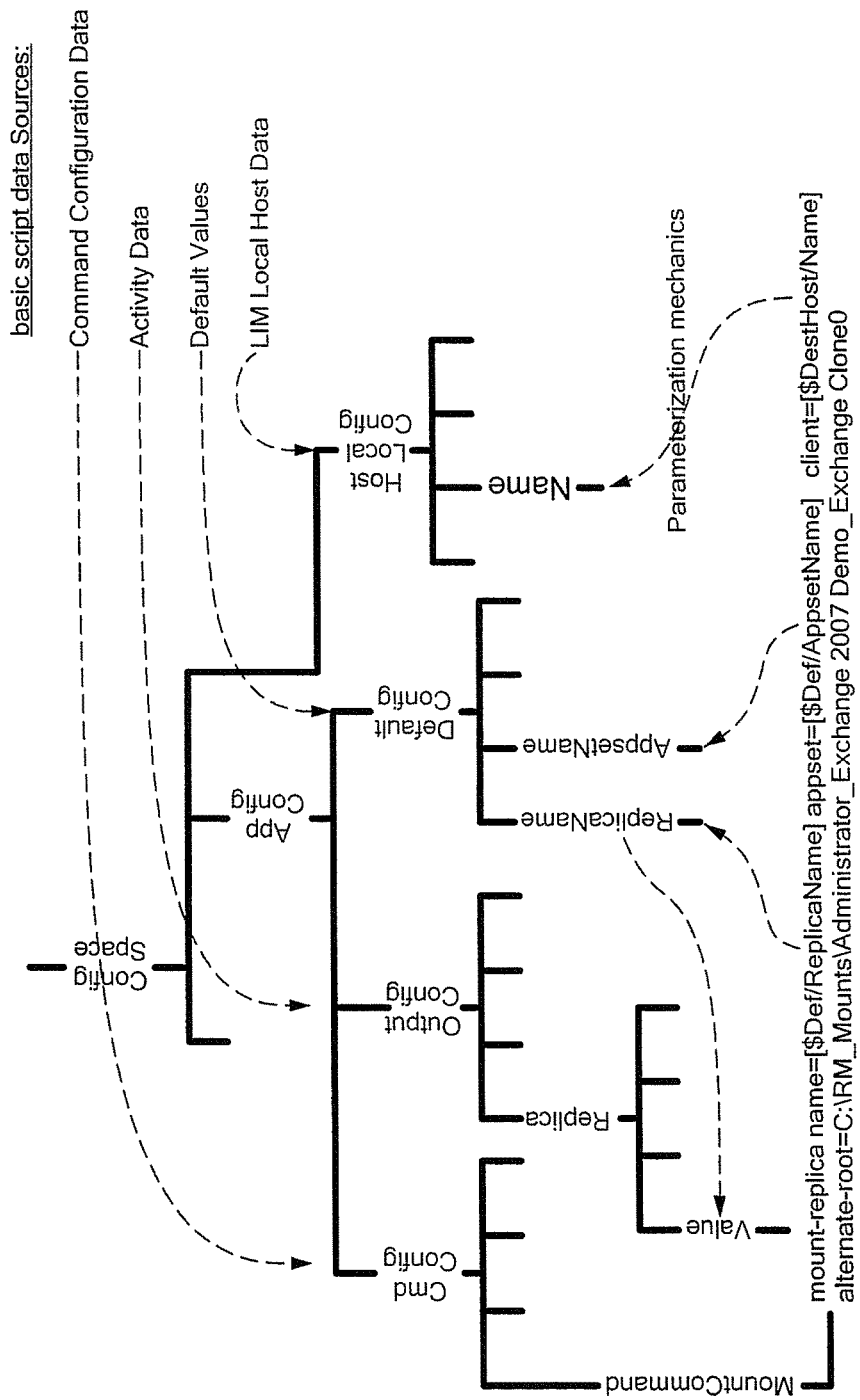
FIG. 5 is a representation of data sources.
Figure 6:
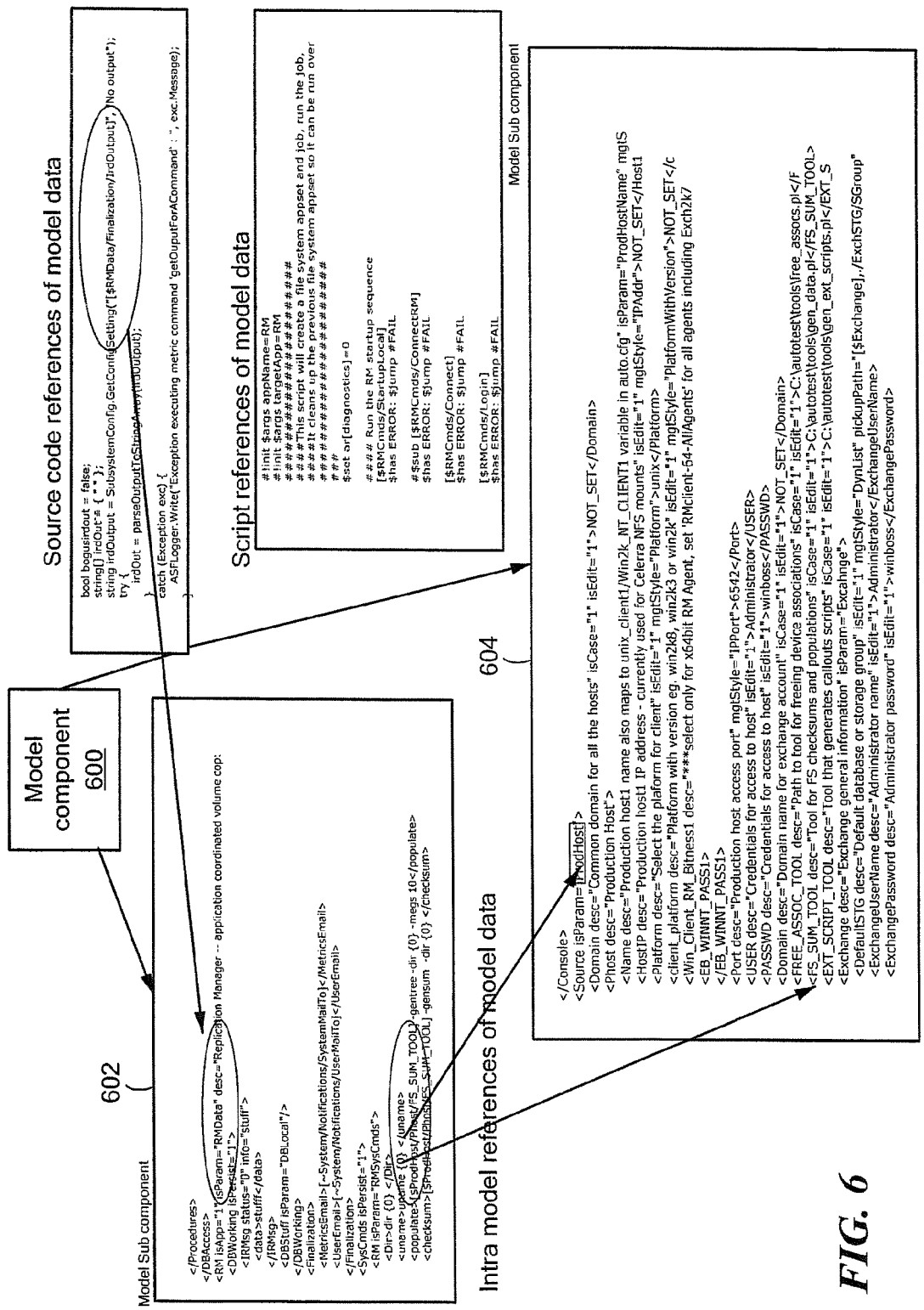
FIG. 6 is a representation of exemplary model and sub model components.

The data is accumulated in a recursive procedure from predetermined configuration files and persisted data from previous system activities. In step 406, an integrity check is performed on the data and internal references are resolved so that a complete model of the system is available. With regard to resolving internal references, the syntax for references includes extended xpath syntax with well known identifying strings which would not interfere with typical data usage. For example:

[~ConfigurationDirDefault] --([~xxxxxx]) resolves to where the ConfigurationDirDefault node is located near the root of the configuration hierarchy.
[$ProdHost/Phost/Name] --value resolves to that found at the PHost/Name location underneath wherever the node tagged with the "isParam='[$xxxxx]'" attribute is found in the combined model. FIGS. 5 and 6 contain additional examples of references and their usages In step 408, startup services are loaded from a service component document 410. Based on configuration data, services, such as communication portals, task schedulers, and tasks configured to run at startup are loaded. In step 412, services 414a-P are initiated to dispatch startup messages to loaded services to initiate service specific functionality. In step 416, data is accumulated from the services 414. While running, services 414 receive requests, engage in service related activity, emit responses, and accumulate data for addition to the model components. In step 418, dynamic XML memory documents receive the accumulated service data 416, which can be persistently stored in the XML documents 404.

It is understood that exemplary services include any service 210 shown in FIG. 2, for example. Exemplary services data is information particular to that services functionality. For example, a data discover services data fragment is set forth below. This service is concerned with storage device information:

</DBFile>
</DBFile>
  <Drive>C:</Drive>
  <Path>C:\Program Files\Microsoft SQL Server/MSSQL10.MSSQLSERVER/MSSQL\DATA\
  <Type>data</Type>
  <FileSizeMB>3</FileSizeMB>
  <LogicalFileName>ReportServer</LogicalFileName>
  <PhysicalFileName>C:\Program Files\Microsoft SQL Server\MSSQLSERVER/<DBName>ReportServer</DBName>
  <VolSize>32201936896</VolSize>
  <VolFree>20999639040</VolFree>
<Devices>
  <Device>
  <Info/>
  <DiskPart/>
  <Instance>
    <Antecedent>\\LRMG088\root\cimv2:
      Win32_DiskPartition.DeviceID="Di
    <Dependent>\\LRMG088\root\cimv2:
      Win32_LogicalDisk.DeviceID="C:"<
    <EndingAddress>32201971199</EndingAddress>
    <StartingAddress>32256</StartingAddress>
    <Drive>PHYSICALDRIVEB</Drive>
    <TotalSize>32201938943</TotalSize>
  </Instance>
  <Details>
  <Medias>
    </Instance>
      <Tag>\\.\PHYSICALDRIVEB</Tag>
    </Instance>
  </Medias>
  <LunsInfo>
    <LunInfo>
      <BytesPerSector>512</BytesPerSector>
      <Capabilities>System.UInt16[ ]</Capabilities>
      <Caption>Virtual HD</Caption>
      <ConfigManagerErrorCode>0</ConfigManagerErrorCode>
      <ConfigManagerUserConfig>False</ConfigManagerUserConfig>
      <CreationClassName>Win32_DiskDrive</CreationClassName>
      >Description>Disk drive</Description>

FIG. 5 shows an exemplary data model catalog and runtime support service structure illustrating how various data sources are knitted together into a single model with cross references. Exemplary data sources include sql servers whose data might be the result of queries; CIM service results which could be configuration data about LUNs and other storage attributes; and/or system discovery service whose data would be the list of applications running on a server. The illustrative data model catalog and runtime support service structure has command configuration data, activity data, default value data, and local host data. Configuration space includes an application.

An exemplary application is RM Test: The system is launched and a particular application becomes the "focus" for various processing functionalities which default to the commands, data, and other model resident information specific to that application. A specific application is defined by attributes in its model component data as follows where the "is App" attribute identifies where the RM application model component is defined:

```
<RM isAPP="1" isParam="RMData" desc="Relication Manager--application coordinated volume copies">
   <DBWorking isPersist="1">
   <IRMsg status="0" info="stuff">
      <data>stuff</data>
   </IRMsg>
   <DBStuff isParam="DBLocal"/>
   </DBWorking>
   <Finalization>
   <MetricsEmail>[System/Notifications/SystemMailTo]
      <MetricsEmail>
   <UserEmail>[~System/Notifications/UserMailTo]</UserEmail>
   </Finalization>
   <SysCmds isPersist="1">
   <RM isParam=RMSysCmds">
      <Dir>dir {ø}</Dir>
```

The application configuration includes a command configuration, an output configuration, and a default configuration. The host local configuration includes a name for the host, for example.

In the illustrated embodiment, the command configuration includes a mount command from a command line, the output configuration includes replica information, which further includes value information. The default configuration includes data for a default replica name and application data. As can be seen, there is a cross reference between the replica value and a replicaname from the default configuration. A command line input, for example, for a mount command at the bottom of FIG. 5 contains configuration information, as shown, including the command (mount), replica name, appset name, and host name. It is understood that replica is a term well known in the field of data replication and storage.

The "source code references . . . " example is a snippet of a C# (Microsoft .Net programming language) source code file. The code fragment shows a call to the configuration subsystem where model data is exposed. The "script references . . . " example provided is a snippet of a test script file which is used for testing other software. The script fragment shows use of commands defined in the RM model component. Both of these examples demonstrate usages of the model data under different runtime environments and different frameworks and for different purposes. This demonstrates the cross-cutting nature provided by exemplary embodiments of that invention in that core functional capabilities are provided for a wide variety of circumstances, including those which had not been originally anticipated. That is, exemplary embodiments of the invention are not like a "java programming language only pre-defined capability" type facility.

FIG. 6 shows an exemplary data model catalog and runtime support service structure usage example. A model component 600 derives first and second model sub components 602, 604. The first model sub component 602 contains data for "RMData," which is a replication manager. The second model sub component 604 contains data for "Prodhost," a production host, which can form a part of a replication system having production and backup storage volumes. As can be seen, there are intra model references to model data. For example, there is a source code reference in XML code to "RMdata" for which data is contained in the first sub model component 602. The first sub model component 602 for RMData, which is "Replication Manager" contains data for replication manager application. The second model sub component 604 contains data in the form of parameters for "Prodhost," which is described as "Common domain for all the hosts." The first model sub component 602 uses data from the second model sub component 604 for Prodhost, which is populated in the first model sub component 602. It is understood that model component 600 mainly demonstrates some of the internal data and its varied uses (script, source), as well as cross referencing.

Figure 7:
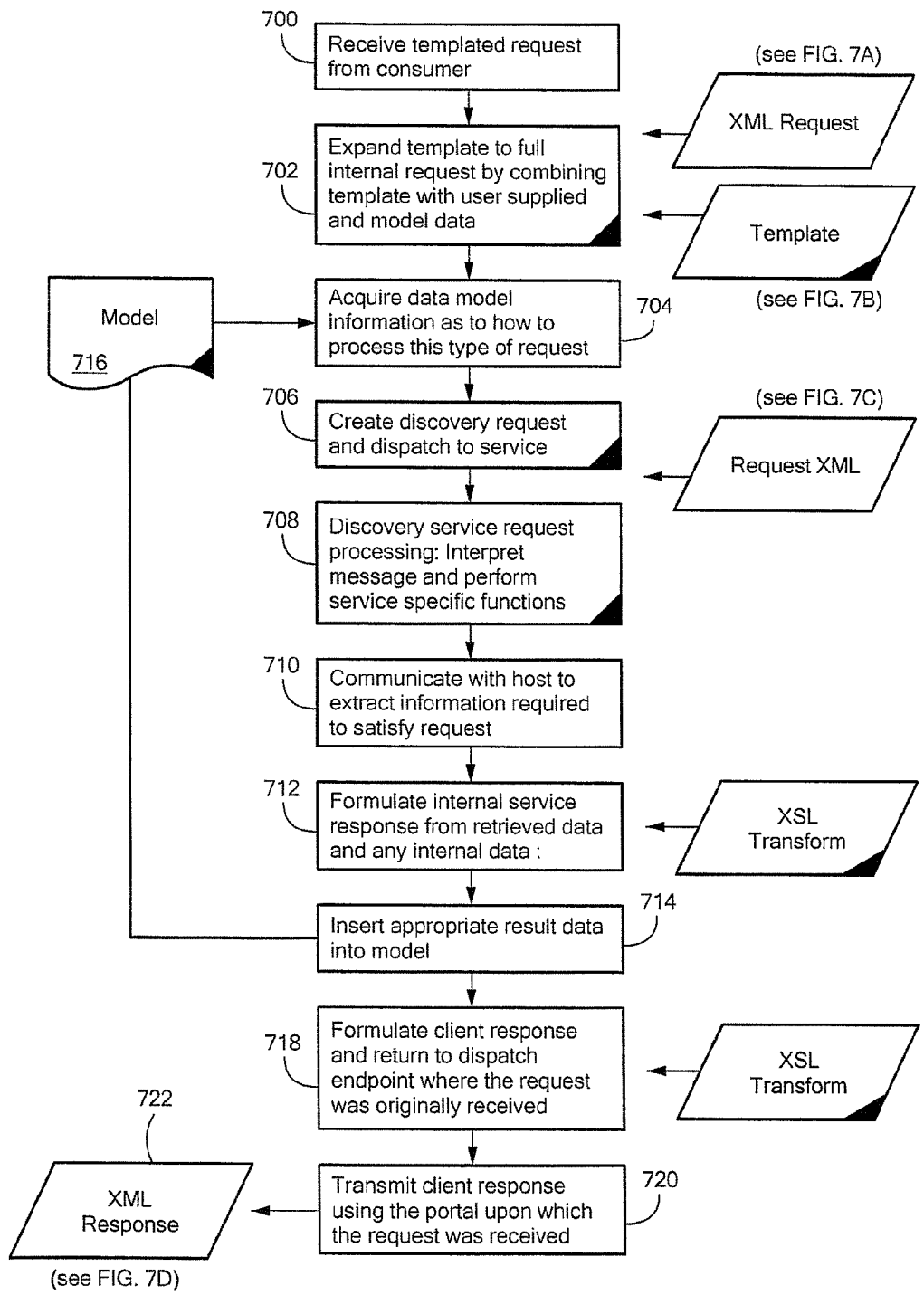
FIG. 7 is a representation of request processing and response generation.

FIG. 7 shows an exemplary sequence of steps for requesting a function, such as backup of a storage volume. In step 700, a template request is received from a user/customer. FIG. 7A shows an exemplary request with template listed as "RMSqlBackup." In step 702, the template is expanded to a full internal request by combining the template with user supplied and model data. FIG. 7B shows an exemplary expanded template format with listed inputs, outputs, and arguments.

Figure 8:
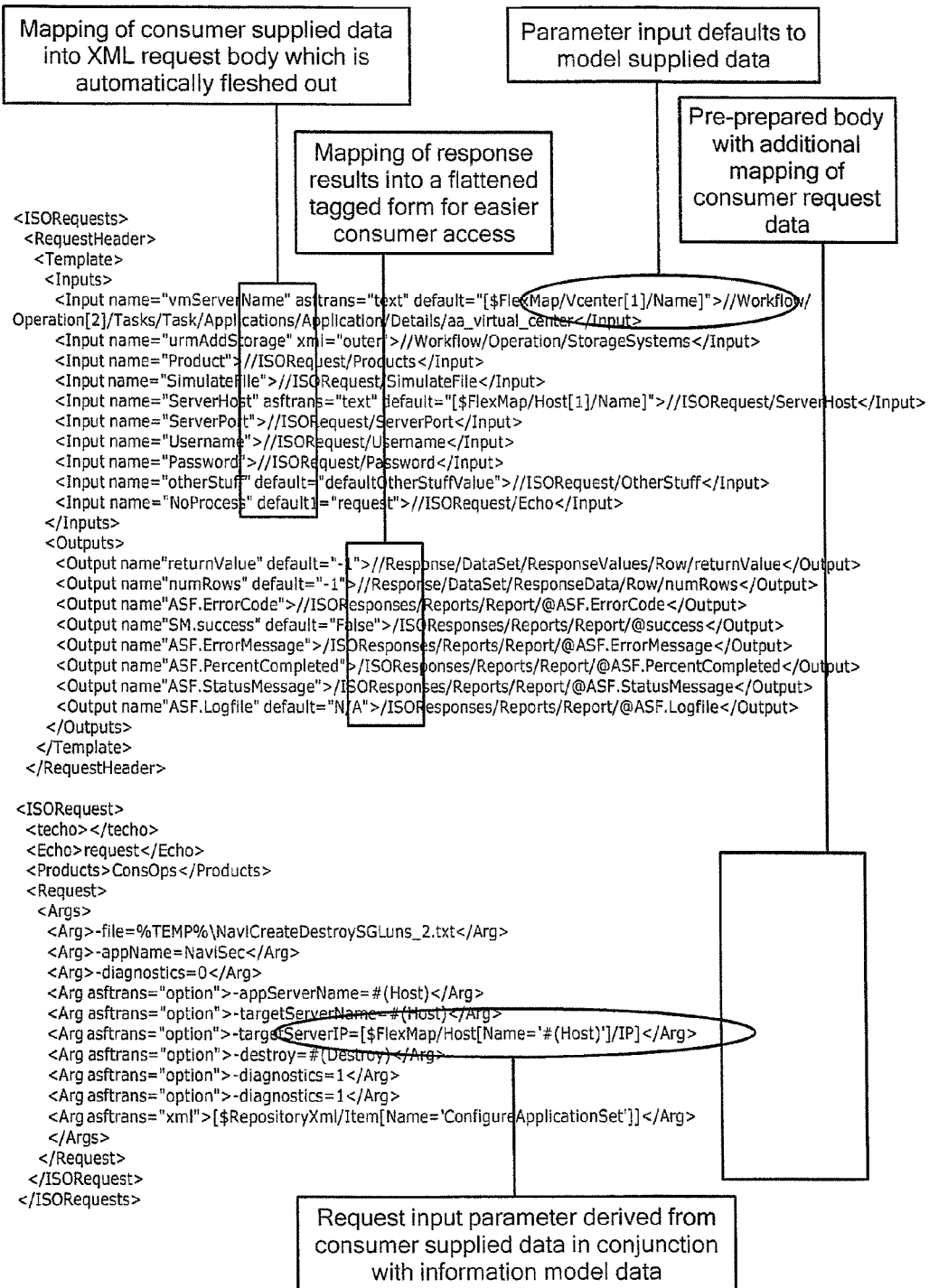
FIG. 8 shows further detail for the representation of FIG. 7B.

FIG. 8 shows an exemplary template, which can be considered as a recipe for constructing a service request and serving up response data. Templates support the ability to compose a full service request from partial user supplied data—it keeps the user from having to understand the full set of internal data as most users do not need to know all the detail. A template also provides mapping to the service request structure so the server side can change its request format without impacting users consuming the service. A template comprises a partially composed service request as well as some mapping data to take user supplied data and insert it into the request to create a fully formed and complete service request. Similar mapping data is provided for output (response) data-taking data from various places in the fully formed response and returning it in a more simply organized set of data.

In general, templates are provided for particular service type operations and are "re-used" for each request that calls for the same service template. Templates can be added to a running system and changed within a running system as functionality is added or changed in the system. Any changes come into effect at the next service request that calls for the template.

Referring to FIG. 8 in conjunction with FIG. 7, when called upon the system reads the template; creates input and output mapping tables from the input and output sections (see step 702). An in memory copy of the ISORequests part of the template is made—this is the partially filled skeleton for the request. The set of user supplied inputs are matched up with the input parameter 'name' elements and the associated user data is inserted in the request at the location specified in the xpath of the named input element. Any defaults in the input section are applied for those input elements for which the user did not supply a named value. Any cross references to model data, as described above, within the now fully formed request are resolved and appropriate value replacements are made (704). The request is then dispatched to the appropriate service (706).

When a response to the request is returned data as appropriate from the response is decoded (712) and data inserted into the model as appropriate (714). An output mapping process, essentially the reverse of the input mapping process, takes place (718). A flattened set of nodes within the response XML with the name from the output mapping section are created. These node values are populated with the data dug out from the xpath indicated location in the service response.

In step 704, data model information, such as "Request input parameter derived from . . . " in FIG. 8 demonstrates a reference to data in the model, is acquired as to how the particular type of request, here a backup request, should be processed.

Figure 9:
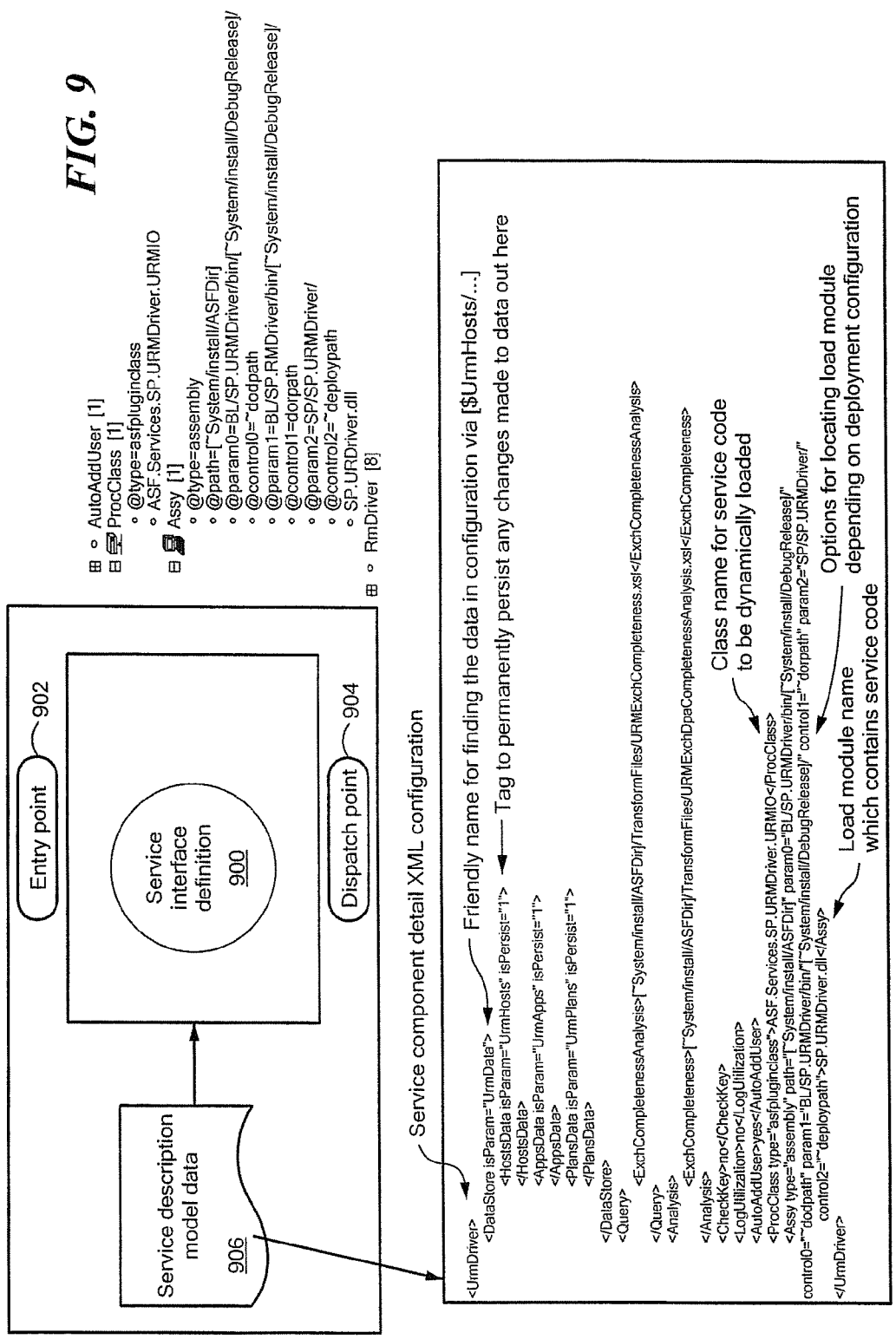
FIG. 9 is a representation of a service interface and service description model data.

In step 706, a discovery request is created and dispatched to a service (see FIG. 9). FIG. 7C shows an exemplary XML file for the request. As part of the create operation, the metadata indicates that an "rmsqlbackup" should be performed.

In step 708, the discovery service decodes the request for host data and performs service specific functions. In step 710, the discovery service communicates with the host to extract host information, e.g., adapter services 210 (FIG. 2) and xml components 404 (FIG. 4) perform as described above. In step 712, an internal service response is formulated from the retrieved data along with any internal data. The response can take the form of an XSL transform.

In step 714, the appropriate result data is inserted into the model 716. In step 718, a client response is formulated and returned to the dispatch endpoint corresponding to where the request was originally received. The response can be a XSL transform. As is known in the art, Extensible Stylesheet Language (XSL) refers to languages used to transform and render XML documents.

In step 720, the client response is transmitted using the portal upon which the request was received. As used herein, portal refers to the means by which the service consumer made contact with the system. A portal is a communications service endpoint implementing a particular industry standard communications mechanism. For example, a system can support a SOAP/HTTP endpoint (web service); a raw sockets endpoint; MSMQ (Microsoft Message Queuing), and Sonic MQ message queuing endpoints; .Net remoting endpoint; etc.

FIG. 7D shows an exemplary XML response providing information for the rmsqlbackup that was requested including data indicating success/failure, timing information, request tracing, and status information.

Referring again to FIG. 7, blocks having a darkened triangle in the lower right corner indicate associated components that can be modified without rebuilding or restarting the system. For example, an updated (replacement) for a service that is currently being used in an operational system can be provided. As demonstrated below, the service executable is defined by the configuration data—the executable component is CP.AWSHost.dll. A replacement might be named CP.AWSHost_NEW.dll. The new file is placed on the running system and the config file is changed to reflect this new component. All currently in-flight service requests to the AWSHostService service will continue to run to completion. All new service requests for AWSHostService will be processed with the new dll--CP.AWSHost_NEW.dll. When all in-flight requests to the old service executable are completed the older component files can be removed from the system. This is an example of a hot-upgrade of a running system and makes possible zero downtime. The advantages of this arrangement will be readily apparent to one of ordinary skill in the art.

|<AWSHostService>
    <ProcClass type="asfpluginclass"> AWSHostProvider.AWSHostService</ProcClass>
    <Assy type="assembly" path="~System/install/ASFDir" param2="CP/CP.AWSHost/" control2="~deploypath">CP.AWSHost.d11</Assy>
    <VirtualDirectory>/AWS/</VirtualDirectory>
    <Port mgtStyle="IPPort" desc="set to 80 if IIS not running so we look like normal web service without IIS">8282</Port>
    <PhysicalDirectory type="path" path="~System/install/ASFDir" param2="CP/CP.AWSHost/" control2="~deploypath">|</PhysicalDirectory>
    <PortDir>[~Plugin/AWSHostService/Port][~Plugin/AWShostService/VirtualDirectory]</PortDir>
    <Prefixes>http://[~System/Configuration/IP]:[~Plugin/AWSHostService/PortDir];http://[~System/Configuration/Service]: [~Plugin/AWSHost
</AWSHostService>

Changed config:
<AWSHostService>
    <ProcClass type="asfpluginclass">AWSHostProvider.AWSHostService</ProcClass>
    <Assy type="assembly" path="~System/install/ASFDir" param2="CP/CP.AWSHost/" control2="~deploypath">CP.AWSHost_NEW|.d11</Assy>
    <VirtualDirectory>/AWS/</VirtualDirectory>
    <Port mgtStyle="IPPort" desc="set to 80 if IIS not running so we look like normal web service without IIS">8282</Port>
<PhysicalDirectory type="path" path="~System/install/ASFDir" param2="CP/CP.AWSHost/" control2="~deploypath"></PhysicalDirectory>
<PortDir>[~Plugin/AWSHostService/Port][~Plugin/AWShostService/VirtualDirectory]</PortDir>
<Prefixes>http://[~System/Configuration/IP]:[~Plugin/AWSHostService/PortDir];http://[~System/Configuration/Service]:[[18]Plugin/A</AWSHostService>

FIG. 8 shows further detail for the XML template of FIG. 7B for constructing an internal message from client request. User/consumer supplied information is mapped into the XML request body. Exemplary user input data includes product, server host, server port, username, password, etc. Response results are mapped into a 'flattened' form for user access. Exemplary outputs include return value, error codes, success indicator, status messages, logfile information, etc. In one embodiment, parameter input defaults to the model are supplied. The template body can include additional mapping of consumer request data. In addition, request input parameters derived from user supplied data in conjunction with model data can form arguments in the template.

FIG. 9 shows an exemplary service interface definition 900 with an entry point 902 and a dispatch point 904. An exemplary service description model data 906 is provided as an XML file. In the illustrated embodiment, the service is "URMDriver." The service description model data 906 contains data to describe the service. As can be seen, a datastore for "UrmData" persistently stores data for "UrmHosts," UrmApps," and "UrmPlans." The class name for service code to be dynamically loaded is "URMDriver." The "Assy" type contains data for options for locating the load module depending upon the deployment configuration and the load module name containing the service code, i.e., URMDriver.dll.

Figure 10:
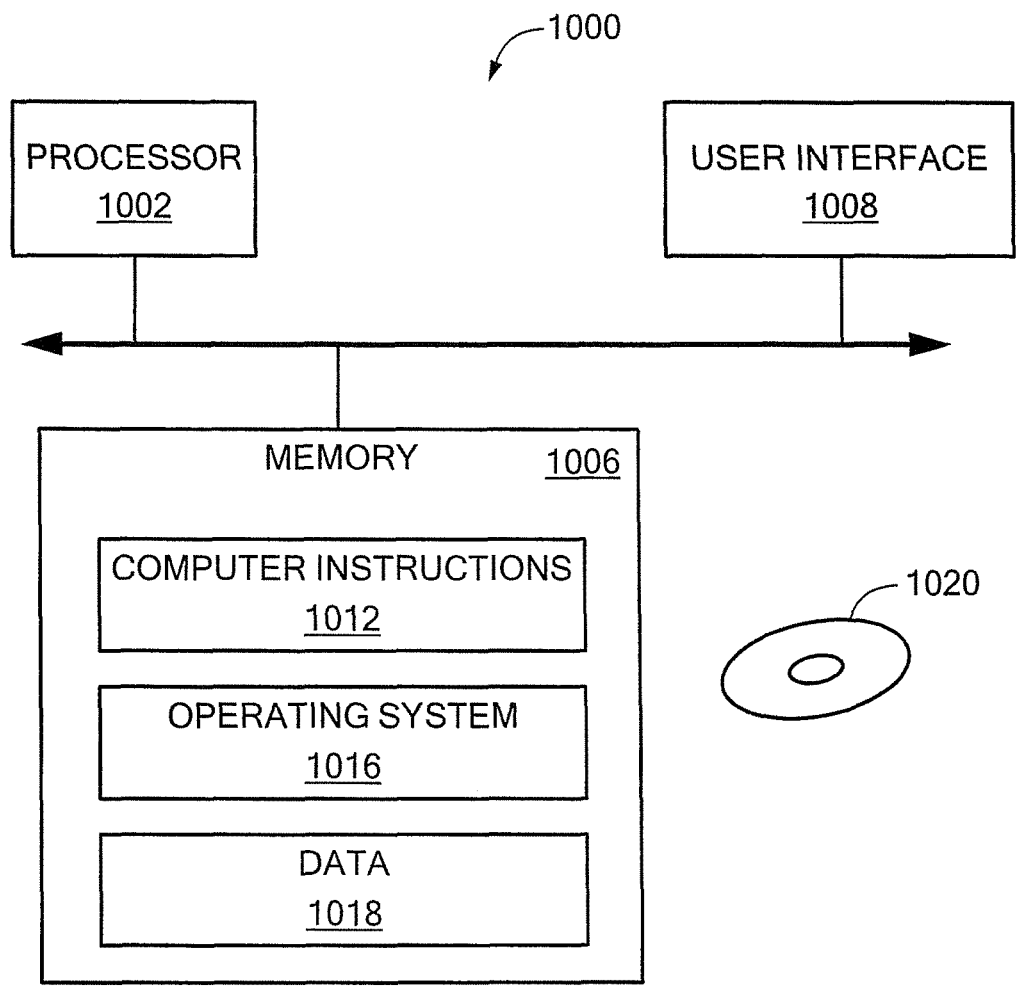
FIG. 10 is a representation of an exemplary computer that can perform at least part of the processing described herein.

Referring to FIG. 10, a computer 1000 includes a processor 1002, a memory 1006 and a user interface (UI) 1008 (e.g., a mouse, a keyboard, a display, touch screen and so forth). The memory 1006 stores computer instructions 1012, an operating system 1016 and data 1018. In one example, the computer instructions 1012 are executed by the processor 1002 out of memory 1004 to perform all or part of the processes described herein (e.g., processes 400 to 900). In one embodiment, an article 1020, such as a disk, comprises non-transitory stored instructions that enable the computer to perform at least part of the processing described above.

The processes described herein are not limited to use with the hardware and software of FIG. 10; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium includes but is not limited to a hard drive, compact disc, flash memory, non-volatile memory, volatile memory, magnetic diskette and so forth but does not include a transitory signal per se.

It is understood that the processing for associated with implementing the system may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A method, comprising:
representing data for components of a data-driven system in respective model components, wherein the model components are structured, composable, homogenized, integratable, and navigable to provide addressable intra-model references including nomenclature for managing addressability of data sources;
wherein the model components include a first model component for an application configuration, a second model component for a service configuration, and a third model component for a system configuration;
generating model sub components from model components for at least some of the system components;
providing data and instructions for interaction with software components external to the system via an application programming interface (API); and
accumulating information from the model components and model sub components to determine a world view of the data-driven system.

2. The method according to claim 1, wherein at least one of the model components comprises a XML file.

3. The method according to claim 1, wherein at least one of the model components includes command configuration data, activity data, default values, and local host data.

4. The method according to claim 1, further including rendering a command line using data from at least one of the model components.

5. The method according to claim 1, wherein a first one of the model components cross references a second one of the model components.

6. The method according to claim 1, further including updating data in at least one of the model components during operation of the system.

7. The method according to claim 1, wherein the system is a data storage system.

8. The method according to claim 1, further including providing data from at least one of the data components in response to a user request.

9. The method according to claim 8, wherein the request has a format defined by a template.

10. The method according to claim 9, wherein the model components are updated during operation of the system.

11. The method according to claim 1, wherein the model components include a first model component for a service component comprising information to locate and load a service dll.

12. The method according to claim 1, where in the model components include a first model component for a server comprising an IP address.

13. The method according to claim 1, wherein at least one of the model components interact with an external service via a request/response.

14. An article, comprising:
a non-transitory machine-readable medium that stores executable instructions, the instructions causing a machine to perform:
representing data for components of a data-driven system in respective model components, wherein the model components are structured, composable, homogenized, integratable, and navigable to provide addressable intra-model references including nomenclature for managing addressability of data sources;

wherein the model components include a first model component for an application configuration, a second model component for a service configuration, and a third model component for a system configuration;

generating model sub components from model components for at least some of the system components;

providing data and instructions for interaction with software components external to the system via an application programming interface (API); and accumulating information from the model components and model sub components to determine a world view of the data-driven system.

15. A system, comprising:

a processor; and a memory in communication with the processor, the memory having stored instructions for execution by the processor for:

representing data for components of a data-driven system in respective model components, wherein the model components are structured, composable, homogenized, integratable, and navigable to provide addressable intra-model references including nomenclature for managing addressability of data sources;

wherein the model components include a first model component for an application configuration, a second model component for a service configuration, and a third model component for a system configuration;

generating model sub components from model components for at least some of the system components;

providing data and instructions for interaction with software components external to the system via an application programming interface (API); and accumulating information from the model components and model sub components to determine a world view of the data-driven system.

* * * * *